US009967898B2

(12) United States Patent
Li et al.

(10) Patent No.: US 9,967,898 B2
(45) Date of Patent: May 8, 2018

(54) PRIORITY SCHEDULING METHOD, USER EQUIPMENT, AND BASE STATION

(71) Applicant: HUAWEI TECHNOLOGIES CO., LTD., Shenzhen (CN)

(72) Inventors: Yue Li, Shenzhen (CN); Xiaolong Guo, Beijing (CN); Song Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 194 days.

(21) Appl. No.: 14/947,289

(22) Filed: Nov. 20, 2015

(65) Prior Publication Data
US 2016/0081109 A1    Mar. 17, 2016

Related U.S. Application Data

(63) Continuation of application No. PCT/CN2013/076063, filed on May 22, 2013.

(51) Int. Cl.
H04W 72/12     (2009.01)
H04W 28/02     (2009.01)
H04W 88/04     (2009.01)

(52) U.S. Cl.
CPC ... H04W 72/1242 (2013.01); H04W 28/0278 (2013.01); H04W 72/1247 (2013.01); H04W 72/1284 (2013.01); H04W 88/04 (2013.01)

(58) Field of Classification Search
CPC ......... H04W 72/1284; H04W 72/1242; H04W 52/02
See application file for complete search history.

(56) References Cited

U.S. PATENT DOCUMENTS 8,311,061 B2    11/2012  Yu et al.
8,902,741 B2 *  12/2014  Zhu ................. H04W 28/0268
                                                     370/229
(Continued)

FOREIGN PATENT DOCUMENTS

CN    101547435 A    9/2009
CN    102291772 A   12/2011
(Continued)

OTHER PUBLICATIONS

International Search Report dated Feb. 27, 2014 in corresponding international application PCT/CN2013/076063.
(Continued)

Primary Examiner — Raj Jain
(74) Attorney, Agent, or Firm — Staas & Halsey LLP

(57) ABSTRACT

An inter-UE priority scheduling method is disclosed, where the method includes: generating an enhanced buffer status report BSR according to buffered data information of multiple benefitted user equipments B-UEs, and reporting the enhanced BSR to a base station eNB, where the enhanced BSR carries buffer data status information of the multiple B-UEs, so that the eNB determines, according to the buffer data status information, priorities of performing data transmission on the multiple B-UEs; receiving uplink scheduling information delivered by the eNB, where the uplink scheduling information carries the priorities of performing data transmission on the multiple B-UEs; and encapsulating some or all of currently buffered data of the multiple B-UEs into one MAC PDU according to the priorities of performing data transmission on the multiple B-UEs, and transmitting the MAC PDU to the eNB.

20 Claims, 10 Drawing Sheets

(56) References Cited

U.S. PATENT DOCUMENTS

| | | | |
|---|---|---|---|
| 2009/0113086 A1* | 4/2009 | Wu | H04W 72/1284 |
| | | | 710/56 |
| 2009/0303954 A1* | 12/2009 | Guo | H04L 47/14 |
| | | | 370/329 |
| 2010/0322144 A1 | 12/2010 | Lee et al. | |
| 2016/0081109 A1* | 3/2016 | Li | H04W 28/0278 |
| | | | 370/329 |

FOREIGN PATENT DOCUMENTS

| | | |
|---|---|---|
| CN | 102413513 A | 4/2012 |
| CN | 102612093 A | 7/2012 |
| EP | 2 461 612 A1 | 6/2012 |
| WO | 2007/131347 A1 | 11/2007 |

OTHER PUBLICATIONS

International Search Report dated Feb. 27, 2014 in corresponding International Patent Application No. PCT/CN2013/076063.
Extended European Search Report dated Apr. 22, 2016 in corresponding European Patent Application No. 13885251.2.

* cited by examiner

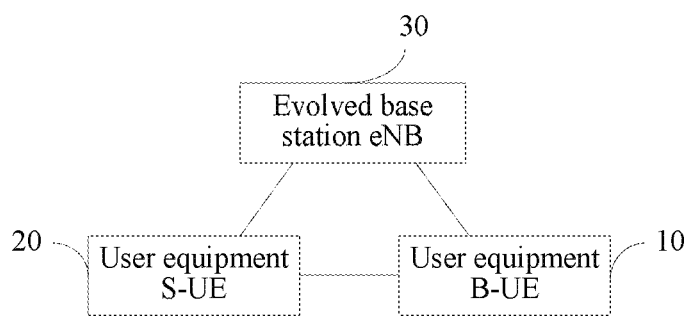

FIG. 1

| Generate an enhanced buffer status report BSR according to buffered data information of multiple benefitted user equipments B-UEs, and report the enhanced BSR to a base station eNB, where the enhanced BSR carries buffer data status information of the multiple B-UEs, so that the eNB determines, according to the buffer data status information, priorities of performing data transmission on the multiple B-UEs | 201 |

| Receive uplink scheduling information delivered by the eNB, where the uplink scheduling information carries the priorities of performing data transmission on the multiple B-UEs | 202 |

| Encapsulate some or all of currently buffered data of the multiple B-UEs into one MAC PDU according to the priorities of performing data transmission on the multiple B-UEs, and transmit the MAC PDU to the eNB | 203 |

FIG. 2

PRIORITY SCHEDULING METHOD, USER EQUIPMENT, AND BASE STATION

CROSS-REFERENCE TO RELATED APPLICATIONS

This application is a continuation of International Application No. PCT/CN2013/076063, filed on May 22, 2013, which is hereby incorporated by reference in its entirety.

TECHNICAL FIELD

The present invention relates to the field of communications technologies, and in particular, to a priority scheduling method, user equipment, and a base station.

BACKGROUND

A MUCC (multiple UEs cooperative communication) technology is used to perform data communication, in which: when an eNB (evolved base station) communicates with B-UE (Benefitted UE, benefitted user equipment), the eNB can simultaneously communicate with the B-UE and another S-UE (supporting user equipment) near the B-UE, so as to forward data of the B-UE to the eNB by using the S-UE. In this way, S-UE having the best channel condition can be chosen to transmit uplink and downlink data of B-UE, so as to improve a data transmission rate. In an existing uplink data scheduling method based on MUCC, an eNB mainly configures a splitting policy for B-UE according to uplink channel quality of the B-UE and S-UE, where the splitting policy is used to notify the B-UE of a proportion of data that is to be transmitted by the B-UE and a proportion of data that is split and that is to be forwarded by the S-UE. When the B-UE needs to send data to the eNB, the B-UE sends the data to the S-UE according to the splitting policy, and transmits the data of the B-UE and the data of the S-UE to the eNB together by using the S-UE. One S-UE may forward data of multiple B-UEs, and data of one B-UE may also be forwarded by multiple S-UEs; moreover, one UE not only may be used as B-UE, but also may be used as S-UE.

Based on the MUCC technology, a single link MUCC (single link cooperative communication) technology also appears. In the single link MUCC technology, one S-UE is mainly used to support multiple B-UEs; that is, the one S-UE is used to forward all uplink data of the multiple B-UEs, so that the multiple B-UEs all enter an uplink out-of-synchronization state. In this case, a system needs to maintain only the S-UE, and therefore, does not need to maintain each B-UE.

However, when all the data of the B-UE is forwarded by using the S-UE, the B-UE first needs to send all the forwarded data to the S-UE for buffering, and the S-UE then requests the eNB to send data; however, when multiple B-UEs are supported by one S-UE, a phenomenon that data of the multiple B-UEs converges on the S-UE occurs, and when the S-UE acquires one uplink authorization, the S-UE can package and send only all the data of the multiple B-UEs according to an order of logical channel priorities, that is, first send data of a high logical channel priority of all the data. Assuming that a communication service is defined as being of a first priority, when B-UE stays in a communication state for a long time, the S-UE continuously sends communication data of the B-UE preferentially, and in this case, data of a low priority of another B-UE is in a state of waiting to be sent for a long time. It can be seen that, in this method, data is only sent according to an order of logical channel priorities, and priorities of B-UEs cannot be scheduled. Therefore, data transmission of multiple B-UEs cannot be fairly considered, resulting in that data of some B-UEs stays in a state of waiting to be sent for a long time.

SUMMARY

Embodiments of the present invention provide a priority scheduling method, user equipment, and a base station, so that when data of multiple B-UEs converges on S-UE, priorities of the B-UEs are scheduled to achieve an object of fairly considering data transmission rates of all B-UEs.

In order to resolve the foregoing technical problem, technical solutions used in the present invention are as follows:

According to a first aspect, the present invention provides a priority scheduling method, including:

generating an enhanced buffer status report BSR according to buffered data information of multiple benefitted user equipments B-UEs, and reporting the enhanced BSR to a base station eNB, where the enhanced BSR carries buffer data status information of the multiple B-UEs, so that the eNB determines, according to the buffer data status information, priorities of performing data transmission on the multiple B-UEs;

receiving uplink scheduling information delivered by the eNB, where the uplink scheduling information carries the priorities of performing data transmission on the multiple B-UEs; and encapsulating some or all of currently buffered data of the multiple B-UEs into one MAC PDU according to the priorities of performing data transmission on the multiple B-UEs, and transmitting the MAC PDU to the eNB.

In a first possible implementation manner of the first aspect, the generating an enhanced buffer status report BSR according to buffered data information of multiple benefitted user equipments B-UEs includes:

generating a UE index that corresponds to each B-UE one by one, and generating, according to the buffered data information of the multiple B-UEs, a conventional BSR that corresponds to each UE index one by one, where the conventional BSR includes buffer data status information of corresponding B-UE; and generating the enhanced BSR that includes the UE index that corresponds to each B-UE one by one and the conventional BSR that corresponds to each UE index one by one.

With reference to the first possible implementation manner of the first aspect, in a second possible implementation manner, the UE index includes an extension field, a type field, and a B-UE identifier, where the extension field is used to indicate whether there is a next UE index after the current UE index;

the type field is used to identify a type of a conventional BSR corresponding to the current UE index; and the B-UE identifier is used to identify a correspondence between the current B-UE and an index number of the current B-UE.

In a third possible implementation manner of the first aspect, the encapsulating some or all of currently buffered data of the multiple B-UEs into one MAC PDU according to the priorities of performing data transmission on the multiple B-UEs includes:

determining B-UE of a first priority and B-UE of a second priority according to the priorities of performing data transmission on the multiple B-UEs, where a priority level of the first priority is higher than a priority level of the second priority; and if it is determined that only one B-UE of a first priority exists, placing, into a MAC PDU to be sent, data in a token bucket corresponding to each logical channel of the one B-UE of a first priority, and when storage space of the MAC PDU is not filled with the data of the one B-UE of a first priority, padding, according to an order of logical channel priorities, remaining space of the MAC PDU with data in token buckets corresponding to all B-UEs of a second priority; or if it is determined that multiple B-UEs of a first priority exist, determining priorities of the multiple B-UEs of a first priority according to the priorities of performing data transmission on the multiple B-UEs, sequentially placing, according to a priority order into a MAC PDU to be sent, data in a token bucket corresponding to each logical channel of the multiple B-UEs of a first priority, and when storage space of the MAC PDU is not filled with the data of the multiple B-UEs of a first priority, padding, according to an order of logical channel priorities, remaining space of the MAC PDU with data in token buckets corresponding to all B-UEs of a second priority; or if it is determined that only the B-UE of a second priority exists, placing, according to an order of logical channel priorities into a MAC PDU to be sent, data in token buckets corresponding to all B-UEs of a second priority.

With reference to the third possible implementation manner of the first aspect, in a fourth possible implementation manner, the placing, into a MAC PDU to be sent, data in a token bucket corresponding to each logical channel of the B-UE of a first priority includes:

placing, according to the order of logical channel priorities, data of each B-UE of a first priority into the MAC PDU to be sent.

With reference to the first aspect, or the first, the second, the third, or the fourth possible implementation manner of the first aspect, in a fifth possible implementation manner, the method further includes: determining a reporting time of the enhanced BSR, so as to report the enhanced BSR at the reporting time.

With reference to the fifth possible implementation manner of the first aspect, in a sixth possible implementation manner, the determining a reporting time of the enhanced BSR includes:

setting a periodic reporting time of the enhanced BSR; or within a non-periodic reporting time, if all data or all remaining data in a logical channel group of B-UE is placed into the current MAC PDU, and/or new data, to be sent, of B-UE arrives, determining that a same moment of transmitting the current MAC PDU is the reporting time of the enhanced BSR.

According to a second aspect, the present invention provides a priority scheduling method, including:

receiving an enhanced BSR reported by supporting user equipment S-UE, where the enhanced BSR carries buffer data status information of multiple B-UEs buffered by the S-UE;

determining, according to the buffer data status information, priorities of performing data transmission on the multiple B-UEs;

sending uplink scheduling information to the S-UE, where the uplink scheduling information carries the priorities of performing data transmission on the multiple B-UEs, so that the S-UE encapsulates some or all of currently buffered data of the multiple B-UEs into one MAC PDU according to the priorities of performing data transmission on the multiple B-UEs; and receiving the MAC PDU transmitted by the S-UE.

In a first possible implementation manner of the second aspect, the method further includes:

at the same time when the MAC PDU transmitted by the S-UE is received, determining whether the enhanced BSR reported by the S-UE is received, and if not, continuing to execute the step of sending uplink scheduling information to the S-UE.

In a second possible implementation manner of the second aspect, the determining, according to the buffer data status information, priorities of performing data transmission on the multiple B-UEs includes:

determining, in the multiple B-UEs, one or more B-UEs of a first priority according to the buffer data status information, and determining that another B-UE except the B-UE of a first priority is B-UE of a second priority, where a priority level of the first priority is higher than a priority level of the second priority; and when it is determined that multiple B-UEs of a first priority exist, determining priorities of the multiple B-UEs of a first priority.

In a third possible implementation manner of the second aspect, the method further includes:

allocating an uplink resource to the S-UE, so that the S-UE determines, according to the allocated uplink resource, a volume of data to be transmitted each time.

According to a third aspect, the present invention provides user equipment, including:

a status report generating unit, configured to generate an enhanced buffer status report BSR according to buffered data information of multiple B-UEs;

a status report reporting unit, configured to report, to a base station eNB, the enhanced BSR generated by the status report generating unit, where the enhanced BSR carries buffer data status information of each B-UE, so that the eNB determines, according to the buffer data status information, priorities of performing data transmission on the multiple B-UEs;

a scheduling information receiving unit, configured to: after the status report reporting unit reports the enhanced BSR, receive uplink scheduling information delivered by the eNB, where the uplink scheduling information carries the priorities of performing data transmission on the multiple B-UEs;

a data packaging unit, configured to encapsulate some or all of currently buffered data of the multiple B-UEs into one MAC PDU according to the priorities, received by the scheduling information receiving unit, of performing data transmission on the multiple B-UEs; and a data sending unit, configured to transmit, to the eNB, the MAC PDU obtained by packaging by the data packaging unit.

In a first possible implementation manner of the third aspect, the status report generating unit includes:

a first generating subunit, configured to generate a UE index that corresponds to each B-UE one by one, and generate, according to the buffered data information of the multiple B-UEs, a conventional BSR that corresponds to each UE index one by one, where the conventional BSR includes buffer data status information of corresponding B-UE, the UE index includes an extension field, a type field, and a B-UE identifier, where the extension field is used to indicate whether there is a next UE index after the current UE index; the type field is used to identify a type of a conventional BSR corresponding to the current UE index; and the B-UE identifier is used to identify a correspondence between the current B-UE and an index number of the current B-UE; and a second generating subunit, configured to generate the enhanced BSR that includes the UE index that corresponds to each B-UE one by one and the conventional BSR that corresponds to each UE index one by one, where the UE index and the conventional BSR are generated by the first generating subunit.

In a second possible implementation manner of the third aspect, the data packaging unit includes:

a prioritized device determining subunit, configured to determine B-UE of a first priority and B-UE of a second priority according to the priorities of performing data transmission on the multiple B-UEs, where a priority level of the first priority is higher than a priority level of the second priority;

a first packaging subunit, configured to: when the prioritized device determining subunit determines that only one B-UE of a first priority exists, place, into a MAC PDU to be sent, data in a token bucket corresponding to each logical channel of the one B-UE of a first priority, and when storage space of the MAC PDU is not filled with the data of the one B-UE of a first priority, pad, according to an order of logical channel priorities, remaining space of the MAC PDU with data in token buckets corresponding to all B-UEs of a second priority;

a second packaging subunit, configured to: when the prioritized device determining subunit determines that multiple B-UEs of a first priority exist, determine priorities of the multiple B-UEs of a first priority according to the priorities of performing data transmission on the multiple B-UEs, sequentially place, according to a priority order into a MAC PDU to be sent, data in a token bucket corresponding to each logical channel of the multiple B-UEs of a first priority, and when storage space of the MAC PDU is not filled with the data of the multiple B-UEs of a first priority, pad, according to an order of logical channel priorities, remaining space of the MAC PDU with data in token buckets corresponding to all B-UEs of a second priority; and a third packaging subunit, configured to: when the prioritized device determining subunit determines that only the B-UE of a second priority exists, place, according to an order of logical channel priorities into a MAC PDU to be sent, data in token buckets corresponding to all B-UEs of a second priority.

With reference to the second possible implementation manner of the third aspect, in a third possible implementation manner, the first packaging subunit or the second packaging subunit is specifically configured to place, according to the order of logical channel priorities, data of each B-UE of a first priority into the MAC PDU to be sent.

With reference to the third aspect, or the first, the second, or the third implementation manner of the third aspect, in a fourth possible implementation manner, the user equipment further includes:

a reporting time determining unit, configured to determine a reporting time of the enhanced BSR, so that the status report reporting unit reports the enhanced BSR at the reporting time.

With reference to the fourth possible implementation manner of the third aspect, in a fifth possible implementation manner, the reporting time determining unit includes:

a first reporting time determining subunit, configured to set a periodic reporting time of the enhanced BSR;

a first judging subunit, configured to determine, within a non-periodic reporting time, whether all data or all remaining data in each logical channel group of B-UE is placed into the current MAC PDU;

a second judging subunit, configured to determine, within a non-periodic reporting time, whether new data, to be sent, of B-UE arrives; and a second reporting time determining subunit, configured to: when the first judging subunit determines that all data or all remaining data in a logical channel group of B-UE is placed into the current MAC PDU, and/or the second judging subunit determines that new data, to be sent, of B-UE arrives, determine that a same moment of transmitting the current MAC PDU is the reporting time of the enhanced BSR.

According to a fourth aspect, the present invention provides a base station, including:

a device information receiving unit, configured to receive an enhanced BSR reported by supporting user equipment S-UE, where the enhanced BSR carries buffer data status information of multiple B-UEs buffered by the S-UE;

a priority determining unit, configured to determine, according to the buffer data status information received by the device information receiving unit, priorities of performing data transmission on the multiple B-UEs;

a scheduling information sending unit, configured to send uplink scheduling information to the S-UE, where the uplink scheduling information carries the priorities, determined by the priority determining unit, of performing data transmission on the multiple B-UEs, so that the S-UE encapsulates some or all of currently buffered data of the multiple B-UEs into one MAC PDU according to the priorities of performing data transmission on the multiple B-UEs; and a data receiving unit, configured to receive the MAC PDU transmitted by the S-UE.

In a first possible implementation manner of the fourth aspect, the base station further includes:

a judging execution unit, configured to: when the data receiving unit receives the MAC PDU transmitted by the S-UE, determine whether the enhanced BSR reported by the S-UE is received, and if not, continue to execute, by using the scheduling information sending unit, the step of sending uplink scheduling information to the S-UE.

In a second possible implementation manner of the fourth aspect, the priority determining unit includes:

a first determining subunit, configured to determine, in the multiple B-UEs, one or more B-UEs of a first priority according to the buffer data status information, and determine that another B-UE except the B-UE of a first priority is B-UE of a second priority, where a priority level of the first priority is higher than a priority level of the second priority; and a second determining subunit, configured to: when the first determining subunit determines that multiple B-UEs of a first priority exist, determine priorities of the multiple B-UEs of a first priority.

In a third possible implementation manner of the fourth aspect, the base station further includes:

a resource allocation unit, configured to allocate an uplink resource to the S-UE, so that the S-UE determines, according to the allocated uplink resource, a volume of data to be transmitted each time.

According to the priority scheduling method, the user equipment, and the base station that are provided in the embodiments of the present invention, when data of multiple B-UEs converges on S-UE, the S-UE notifies, in a manner of reporting an enhanced BSR to an eNB, conditions of data sent by B-UEs that is buffered by the S-UE, the eNB schedules sending priorities of the B-UEs according to data buffer conditions of the B-UEs, and the S-UE then packages the data of the B-UEs according to priorities and based on a scheduling result delivered by the eNB, and uploads the data to the eNB. By scheduling the priorities of the B-UEs, a packet uploaded each time includes data of only one B-UE, or includes data of multiple B-UEs; data of all B-UEs is sent in different priority orders in batches. Moreover, based on a different data volume, buffered in the S-UE, of data of each B-UE, the data of each B-UE is also sent in different batches, and data of B-UE of a high priority is sent first in early batches. During this period, some or all data of B-UE of a relatively low priority is also sent; that is, when the data of the B-UE of a high priority is sent preferentially, some data of the B-UE of a relatively low priority is also sent. Therefore, data transmission rates of B-UEs can be fairly considered, a case in which continuous uploading of data of some B-UEs keeps data of other B-UEs in a wait state for a long time is avoided, and fairness and flexibility are ensured.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic diagram of a communications system including B-UE, S-UE, and an eNB according to an embodiment of the present invention;

FIG. 2 is a schematic flowchart of Embodiment 1 of a priority scheduling method according to an embodiment of the present invention;

DESCRIPTION OF EMBODIMENTS

Figure 3:
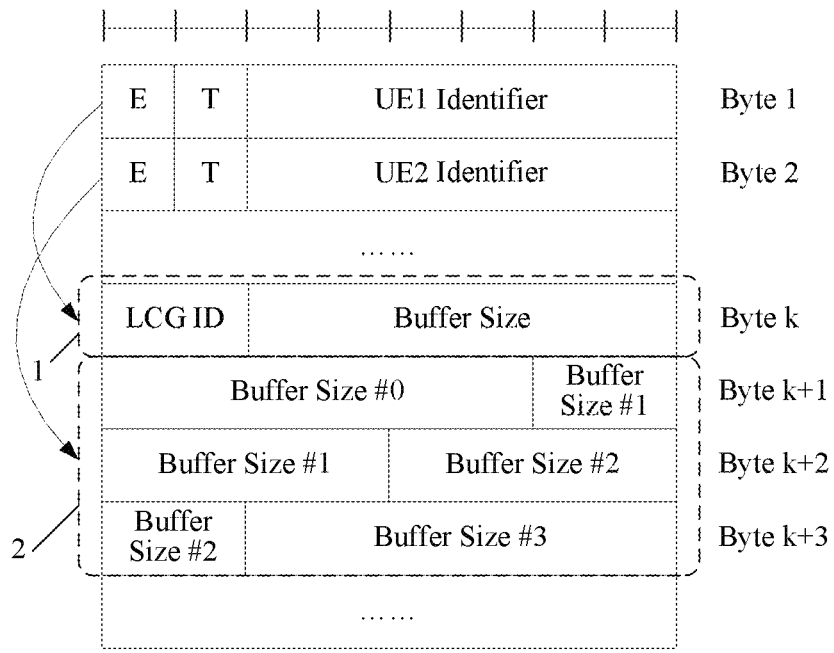
FIG. 3 is a schematic diagram of a first format of an enhanced BSR according to an embodiment of the present invention.

In order to enable a person skilled in the art to better understand the solutions in the embodiments of the present invention, the following describes the embodiments of the present invention in more detail with reference to accompanying drawings and implementation manners.

The priority scheduling method, the user equipment, and the base station in the embodiments of the present invention are applicable to a communications system that includes S-UE (Supporting UE, supporting user equipment), B-UE (Benefitted UE, benefitted user equipment), and an eNB (evolved NodeB, evolved base station) and that is shown in FIG. 1. This specification mainly introduces the communications system including S-UE, B-UE, and an eNB, but is not merely limited to the communications system. Before the specific technical solutions of the embodiments of the present invention are introduced, the communications system including the S-UE, the B-UE, and the eNB is first briefly introduced below.

When the eNB communicates with B-UE, the B-UE is enabled to send, to the S-UE in a short range communication manner (for example, Bluetooth and WiFi), data required to be transmitted to the eNB, so that one or more S-UEs having relatively good channel quality are used to forward data of the B-UE. S-UE having relatively good channel quality is chosen to forward data, so that not only a transmission rate of the forwarded data of the B-UE can be improved, but also when all data of the multiple B-UEs is forwarded by using one S-UE, only the S-UE needs to be maintained, thereby reducing massive maintenance of multiple B-UEs.

As shown in FIG. 2, FIG. 2 is a schematic flowchart of Embodiment 1 of a priority scheduling method according to an embodiment of the present invention. Steps of implementing the method by S-UE include:

Step 201: S-UE generates an enhanced BSR according to buffered data information of multiple B-UEs, and reports the enhanced BSR (buffer status report, buffer status report) to an eNB, where the enhanced BSR carries buffer data status information of the multiple B-UEs, so that the eNB determines, according to the buffer data status information, priorities of performing data transmission on the multiple B-UEs.

In step 201, the S-UE first acquires data that is buffered by the S-UE and that is sent by B-UEs, generates the enhanced BSR according to the data information, and transmits, in a manner of reporting the enhanced BSR to a network side (eNB), data status information of the multiple B-UEs buffered on a side of the S-UE, so as to report, to the eNB, a condition of uplink data buffered on the side of the S-UE, that is, notify the eNB of: data of which B-UEs is buffered on the side of the S-UE, data on which logical channels of each B-UE is buffered, and a data buffer size on a corresponding logical channel.

In step 201, the enhanced BSR is generated mainly by using the following method: first, generating a UE index that corresponds to each B-UE one by one, and generating, according to the buffered data information of the multiple B-UEs, a conventional BSR that corresponds to each UE index one by one, where the conventional BSR includes buffer data status information of corresponding B-UE; and then, generating the enhanced BSR that includes the UE index that corresponds to each B-UE one by one and the conventional BSR that corresponds to each UE index one by one.

As shown in FIG. 3, FIG. 3 is a schematic diagram of a first format of an enhanced BSR. A reporting format of a conventional BSR is multiplexed in the enhanced BSR, and the enhanced BSR mainly includes: a UE index E/T/UEx Identifier that corresponds to each B-UE one by one, and a conventional BSR that corresponds to each UE index one by one. The UE index includes, but is not limited to, an extension field, a type field, and a B-UE identifier. The conventional BSR includes buffer data status information of corresponding B-UE, where the buffer data status information includes a data buffer size of each logical channel group of the B-UE.

Assuming that uplink data of n B-UEs (which are B-UE1, B-UE2, . . . , B-UEn respectively) is buffered on the side of the S-UE, a UE index of B-UE1 is an E/T/UE1 Identifier, a UE index of B-UE2 is an E/T/UE2Identifier, . . . , and a UE index of the B-UEn is an E/T/UEn Identifier.

A field "E" of each UE index is an extension field, and is used to indicate whether there is a next UE index after the current UE index. For example, for the E/T/UE1 Identifier in FIG. 3, E in this UE index is used to indicate whether the UE index E/T/UE2 Identifier of B-UE2 is stored after the E/T/UE1 Identifier.

A field "T" of each UE index is a type field, and is used to identify a type of a conventional BSR corresponding to an index of the current UE. There are long and short conventional BSRs, which are mainly classified into long types and short types; in addition, when reported, a conventional BSR is divided into four LCGs (logical channel group, logical channel group); if usable data exists in only one LCG, a short type is reported; and if usable data exists in more than one LCG, a long type is reported. For example, in FIG. 3, the index E/T/UE1 Identifier corresponds to a conventional BSR in a dotted box 1, the conventional BSR is a short type. The index E/T/UE2Identifier corresponds to a conventional BSR in a dotted box 2, and the conventional BSR is a long type. The BSR in the dotted box 2 is divided into four logical channel groups that are LCG0, LCG1, LCG2, and LCG3. The S-UE maps each logical channel of each B-UE to a logical channel group to which the logical channel belongs, Buffer Size#0, Buffer Size#1, Buffer Size#2, and Buffer Size#3 (because each Buffer Size occupies 6 bits, and one byte is equal to 8 bits, Buffer Size#0 occupies the first 6 bits of the $(K+1)^{th}$ byte, Buffer Size#1 occupies the last 2 bits of the $(K+1)^{th}$ byte and the first 4 bits of the $(K+2)^{th}$ byte, Buffer Size#2 occupies the last 4 bits of the $(K+2)^{th}$ byte and the first 2 bits of the $(K+3)^{th}$ byte, and Buffer Size#3 occupies the last 6 bits of the $(K+3)^{th}$ byte) indicate data buffer sizes in the logical channel groups LCG0, LCG1, LCG2, and LCG3. A conventional BSR corresponding to each B-UE multiplexes an existing BSR format of a conventional LTE system, which is not described herein in detail again.

A field "UEn Identifier" of each UE index is a UE identifier, and is used to identify a correspondence between the current B-UE and an index number of the current B-UE, that is, identify which B-UE each UE index belongs to, and the UE identifier can be configured by RRC (Radio Resource Control, radio resource control) when MUCC is established.

In addition, a correspondence between B-UE and a conventional BSR can be determined in the following manner: in FIG. 3, each UE index is sequentially placed into an index area starting from byte 1, and each conventional BSR in a conventional BSR area corresponds to an order of placing UE indexes one by one, that is, the first UE index in the index area corresponds to the first conventional BSR in the conventional BSR area; therefore, a UE1 Identifier identifies that the first conventional BSR in the conventional BSR area corresponds to the first UE index in the index area, a UE2 Identifier identifies that the second conventional BSR in the conventional BSR area corresponds to the second UE index in the index area, and the rest cases can be obtained in the same manner.

Figure 4:
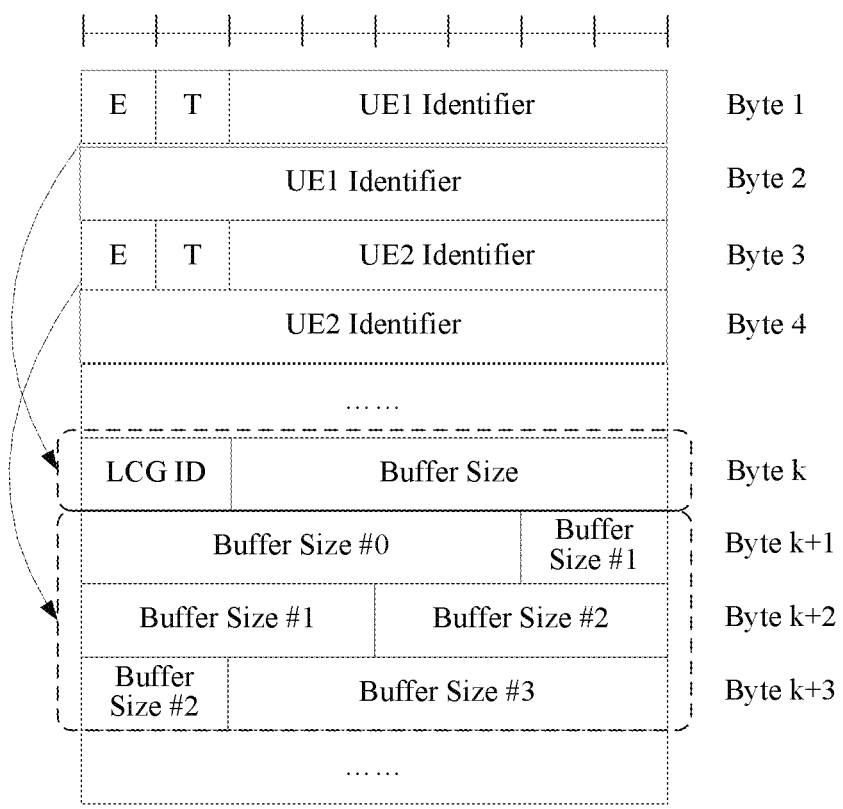
FIG. 4 is a schematic diagram of a second format of an enhanced BSR according to an embodiment of the present invention.
Figure 5:
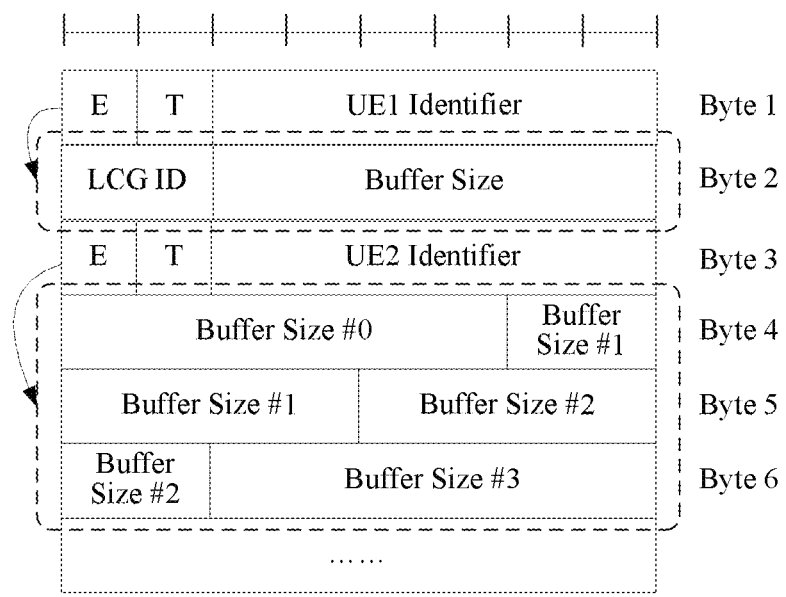
FIG. 5 is a schematic diagram of a third format of an enhanced BSR according to an embodiment of the present invention.

In addition, reference is made to a schematic diagram of a second format of an enhanced BSR shown in FIG. 4 and a schematic diagram of a third format of an enhanced BSR shown in FIG. 5. In FIG. 4, when a quantity of B-UEs is relatively large, a subordination relationship between B-UE and a B-UE index needs to be identified by using more bits bit; therefore, each UE index part is extended from an original 1 byte (1 row) to 2 bytes (2 rows), and a UEn identifier is increased from 6 bits shown in FIG. 3 to 14 bits. As compared with FIG. 3, in FIG. 5, locations of a UE index and a corresponding conventional BSR are changed, and a conventional BSR corresponding to each UE index is placed after the UE index. Certainly, a format of the enhanced BSR is not limited to the three forms shown in FIG. 3 to FIG. 5, and any variations based on the three forms are protected content of the present invention, which is not described one by one herein again.

Step 202: The S-UE receives uplink scheduling information delivered by the eNB, where the uplink scheduling information carries the priorities of performing data transmission on the multiple B-UEs.

Priorities of different B-UEs are recorded in the uplink scheduling information, and are used to point out data of which B-UE is sent first and data of which B-UE is sent later.

Step 203: After receiving the uplink scheduling information, the S-UE encapsulates some or all of currently buffered data of the multiple B-UEs into one MAC PDU according to the priorities of performing data transmission on the multiple B-UEs, and transmits the MAC PDU to the eNB.

In a process in which an eNB schedules a priority of B-UE, after a volume of data buffered on a side of the S-UE is acquired, an uplink resource is allocated to the S-UE according to a volume of buffered data and channel quality, so as to notify the S-UE of a volume of data to be uploaded each time. Assuming that the volume of data to be uploaded each time is 500 bits, if data buffered on the side the S-UE is less than or equal to 500 bits, all data can be padded into the MAC PDU and uploaded to the eNB. However, if data buffered on the side of the S-UE is greater than 500 bits, the S-UE places, according to the priorities of performing data transmission on the multiple B-UEs, data of 500 bits of a high priority into a MAC PDU (MAC Protocol Data Unit, MAC Protocol data unit) to be sent for assembling and packaging, so that B-UE of a high priority is sent to the eNB preferentially.

The uplink scheduling information corresponds to an assembling and packaging process in a MAC PDU one by one, and each time the eNB delivers the uplink scheduling information, the S-UE encapsulates currently buffered data of B-UE into one MAC PDU and transmits the data to the eNB. However, because encapsulation space of the MAC PDU is related to the uplink resource allocated by the eNB to the S-UE, only a limited volume of data can be encapsulated each time.

Referring to a schematic flowchart of performing assembling and packaging of a MAC PDU shown in FIG. 6, for the "encapsulating some or all of currently buffered data of the multiple B-UEs into one MAC PDU according to the priorities of performing data transmission on the multiple B-UEs" in step 203, data packaging is performed each time in the following manner:

Step 601: Determine B-UE of a first priority and B-UE of a second priority according to the priorities of performing data transmission on the multiple B-UEs, where a priority level of the first priority is higher than a priority level of the second priority.

Step 602: Determine whether it is determined that the B-UE of a first priority exists; and if yes, perform step 603 to step 606; or if not, determine that only the B-UE of a second priority exists, and perform step 607.

Step 603: Determine a quantity of B-UEs of a first priority.

Step 604: Determine whether the quantity of B-UEs of a first priority is greater than 1; and if not, it indicates that only one B-UE of a first priority exists, and perform step 605; or if yes, it indicates that multiple B-UEs of a first priority exist, and perform step 606.

Step 605: Place, into a MAC PDU to be sent, data in a token bucket corresponding to each logical channel of the one B-UE of a first priority, and when storage space of the MAC PDU is not filled with the data of the one B-UE of a first priority, pad, according to an order of logical channel priorities, remaining space of the MAC PDU with data in token buckets corresponding to all B-UEs of a second priority.

Step 606: Determine priorities of the multiple B-UEs of a first priority according to the priorities of performing data transmission on the multiple B-UEs, sequentially place, according to a priority order into a MAC PDU to be sent, data in a token bucket corresponding to each logical channel of the multiple B-UEs of a first priority, and when storage space of the MAC PDU is not filled with the data of the multiple B-UEs of a first priority, pad, according to an order of logical channel priorities, remaining space of the MAC PDU with data in token buckets corresponding to all B-UEs of a second priority.

For each B-UE of a first priority, data of each B-UE of a first priority is placed into the MAC PDU according to the order of logical channel priorities.

It should be noted that, in a process of assembling and packaging of a MAC PDU, the following three cases occur: First, all data of B-UE of a first priority is placed into the MAC PDU and the MAC PDU is not filled yet. Second, all the data of the B-UE of a first priority is placed into the MAC PDU and the MAC PDU is completely filled. Third, when some data of the B-UE of a first priority is placed into the MAC PDU, the MAC PDU is already filled. For a case in which the current MAC PDU is filled, the step of uploading data can be directly performed next. When the MAC PDU is not filled with the B-UE of a first priority, padding is performed next by using data of another B-UE of a second priority, until the MAC PDU is filled.

Step 607: Place, according to an order of logical channel priorities into a MAC PDU to be sent, data in token buckets corresponding to all B-UEs of a second priority.

Figure 6:
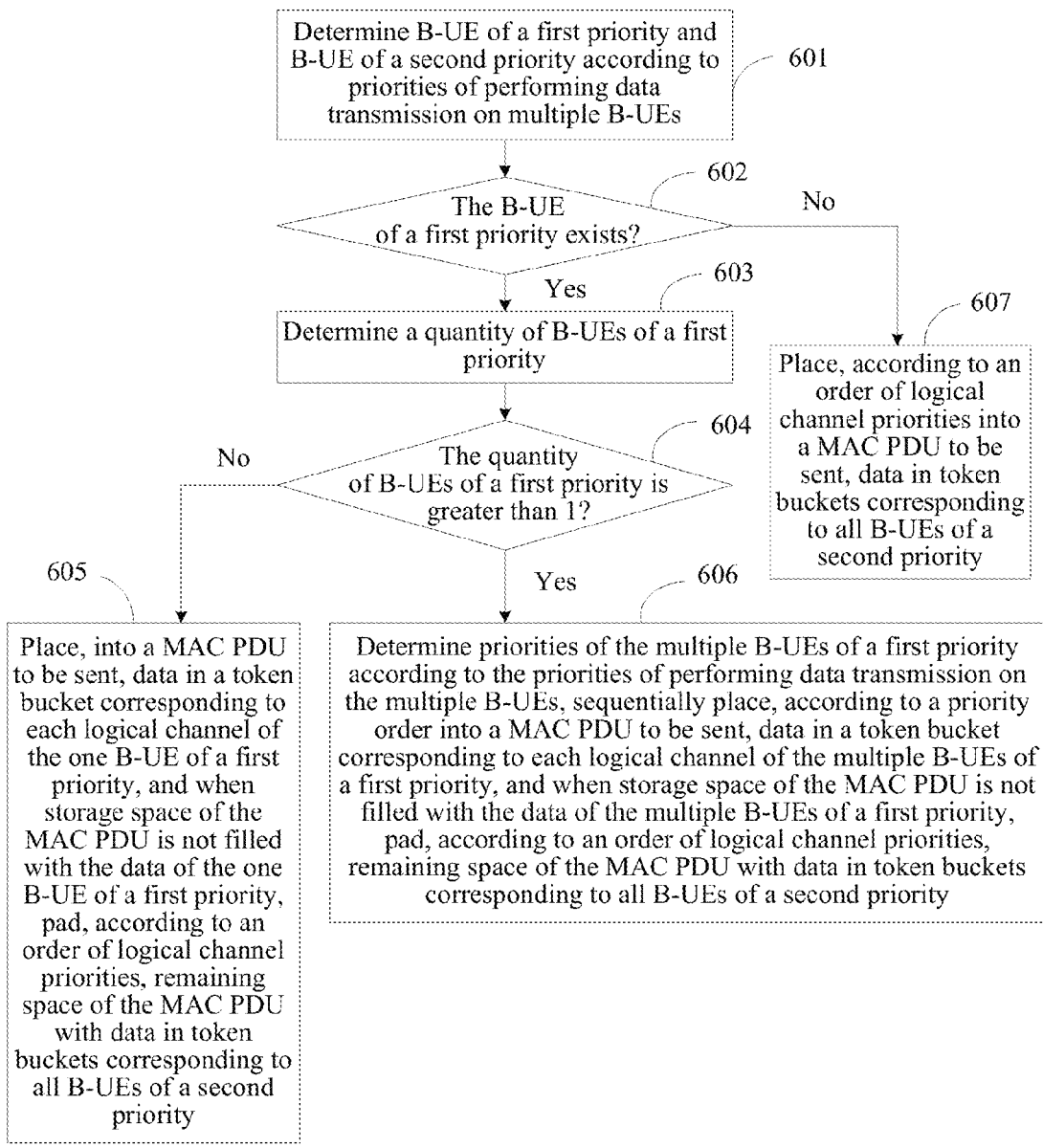
FIG. 6 is a schematic flowchart of performing assembling and packaging on a MAC PDU according to an embodiment of the present invention.

The foregoing process of performing assembling and packaging of a MAC PDU shown in FIG. 6 is described below by using an example.

Figure 7:
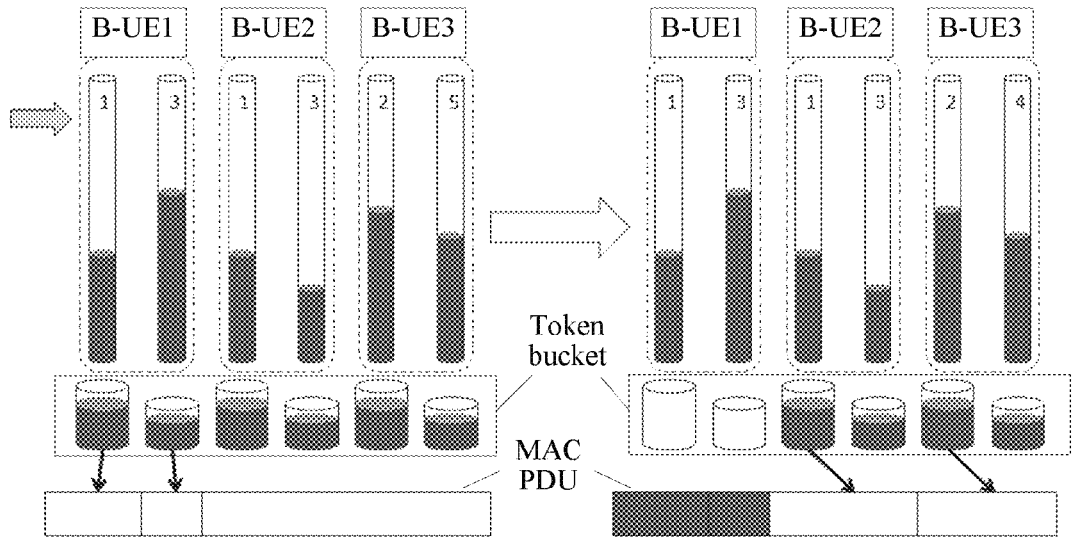
FIG. 7 is a visual schematic diagram of performing assembling and packaging on a MAC PDU according to an embodiment of the present invention.

Referring to a visual schematic diagram of performing assembling and packaging of a MAC PDU shown in FIG. 7, it is assumed that data on two logical channels in each B-UE is to be sent, a bar chart in a dotted box represents data volumes on different logical channels in each B-UE, and numbers in the bar chart represents a logical channel priority. An example in which only one B-UE of a first priority exists is used below. Assuming that B-UE1 is B-UE of a first priority, data in a token bucket on each logical channel of B-UE1 is placed into a MAC PDU to be sent at a MAC layer, and is placed according to an order of logical channel priorities, that is, data of a logical channel priority being 1 of B-UE1 is first placed into the MAC PDU, and then, data of a logical channel priority being 3 of B-UE1 is placed into the MAC PDU; in this case, the MAC PDU is not filled yet; because neither B-UE2 nor B-UE3 is B-UE of a first priority, the MAC PDU may be padded with all data of B-UE2 and B-UE2 according to the order of logical channel priorities, that is, data of a logical channel priority being 1 of B-UE2, data of a logical channel priority being 2 of B-UE3, data of a logical channel priority being 3 of B-UE2, and data of a logical channel priority being 4 of B-UE3 are padded sequentially, until the MAC PDU is filled.

Certainly, other cases also exist. If both B-UE1 and B-UE2 are B-UEs of a first priority, and a priority of B-UE1 is higher than a priority of B-UE2, the data of a logical channel priority being 1 of B-UE1 and data of a logical channel priority being 3 of B-UE1 are sequentially placed into the MAC PDU first, and data of B-UE2 is then placed, until the MAC PDU is filled. If only B-UE3 is B-UE of a first priority, data of priorities being 2 and 5 of B-UE3 is sequentially padded first; then, because B-UE1 and B-UE2 both have data of a priority being 1 and 3, one of two pieces of data of a priority level being 1 can be randomly chosen first, the other one piece is then used to pad, and afterwards, one piece of a priority being 3 is then randomly chosen for padding, until the MAC PDU is filled.

It should be noted that, data, buffered on the side of the S-UE, on different logical channels of each B-UE is sequentially stored in a corresponding token bucket, and each time a MAC PDU is padded, instead of all data on each logical channel, only data in a token bucket corresponding to each logical channel is used for padding; therefore, sending of data of each B-UE is completed in different batches; therefore, when the MAC PDU of a current time is padded, if the MAC PDU of the current time is not filled with data in a token bucket of B-UE, for example, B-UE1, of a high priority this time, remaining space of the MAC PDU of the current time is padded with data of B-UE of a relatively low priority, and afterwards, when there is no new data of B-UE of a higher priority arrives on the side of the S-UE, a next MAC PDU to be sent is also padded first with new data in the token bucket of B-UE1. Therefore, when the data of the B-UE of a high priority is sent preferentially, other data of a relatively low priority is also sent, which therefore fairly considers simultaneous transmission of data of multiple B-UEs.

Figure 8:
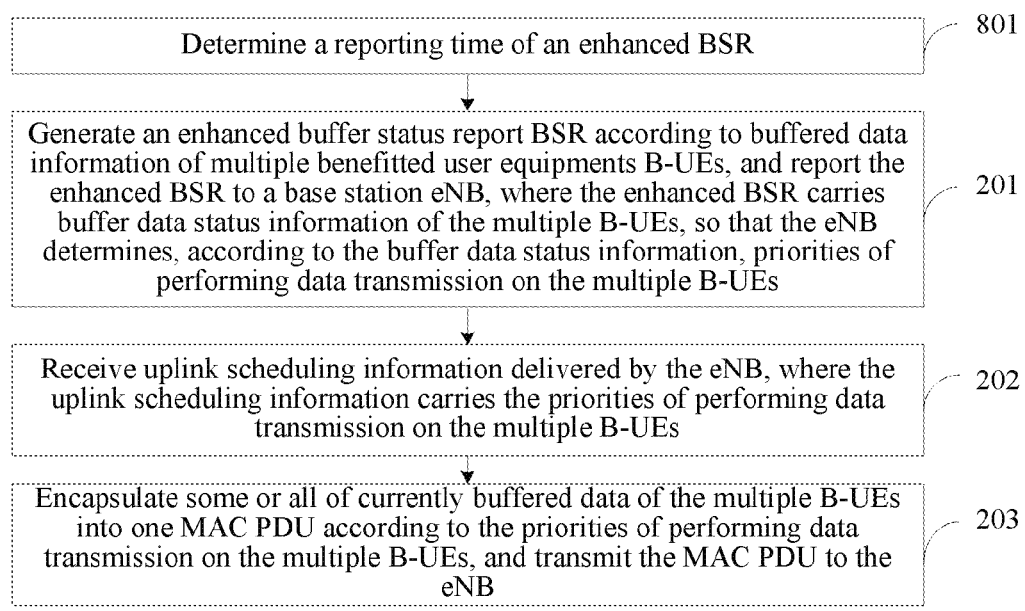
FIG. 8 is a schematic flowchart of Embodiment 2 of a priority scheduling method according to an embodiment of the present invention.

As shown in FIG. 8, FIG. 8 is a schematic flowchart of Embodiment 2 of a priority scheduling method according to an embodiment of the present invention. In order to schedule priorities of UEs, a reporting time of an enhanced BSR further needs to be determined on a side of S-UE, so that the S-UE reports the enhanced BSR according to the reporting time determined in advance. Based on above Embodiment 1, the present invention further includes:

Step 801: Determine a reporting time of an enhanced BSR, so that S-UE reports the enhanced BSR at the reporting time.

Step 801 can be implemented in the following manner:

configuring a timer, so as to set, by using the timer, a periodic reporting time of the enhanced BSR; determining in real time whether all data or all remaining data in a logical channel group of B-UE is placed into a current MAC PDU, and monitoring in real time whether new data, to be sent, of B-UE arrives; and if within a non-periodic reporting time, all data or all remaining data in a logical channel group of B-UE is placed into the current MAC PDU, and/or new data, to be sent, of B-UE arrives, determining that a same moment of transmitting the current MAC PDU is the reporting time of the enhanced BSR; it should be noted that, the periodic reporting time may be the same as the determined reporting time (that is, the same moment of transmitting the current MAC PDU), and in this case, an enhanced BSR is transmitted only once.

Specifically, the S-UE periodically reports the enhanced BSR by configuring the timer; for example, an interval between the periodic reporting times is 10 seconds, 30 seconds, or the like, that is, the enhanced BSR is reported once every 10 seconds or every 30 seconds, and the enhanced BSR is reported each time the periodic reporting time is reached.

In addition, each B-UE and new data of B-UE needs to be monitored in real time, and if within a non-periodic reporting time, all data or all remaining data in a logical channel group of B-UE is placed into the current MAC PDU (that is, when sending of all data of logical channel groups of B-UE is about to be completed), and/or new data, to be sent, of B-UE arrives at the S-UE, the enhanced BSR also needs to be reported once. An example in which B-UE1 is B-UE of a first priority is used as an example below. If assembling and packaging of a MAC PDU is performed by using an enhanced BSR that is reported last time, all data in a logical channel group of B-UE1 is placed into a MAC PDU to be sent currently, which indicates that all data, buffered on the side of the S-UE, in a logical channel group of B-UE1 is uploaded to an eNB; in this case, it is determined that a moment of sending the MAC PDU of a current time is the reporting time of the enhanced BSR. The enhanced BSR reported the current time further carries data information, which is all sent, of B-UE1. If new data, to be sent, of B-UE arrives on the side of the S-UE after a last time of reporting an enhanced BSR and before the current time of reporting the enhanced BSR, it is determined that a moment of sending a MAC PDU (which is an RMAC PDU in which assembling and packaging is performed according to the enhanced BSR that is reported last time) the current time is the reporting time of the enhanced BSR in the current time, where the enhanced BSR of the current time further carries new data information of the B-UE. In addition, there is further a case in which the foregoing two cases simultaneously exist, and the enhanced BSR is reported once as long as either of the two cases is met.

Certainly, the enhanced BSR may further be reported only at a periodic reporting time configured by the timer, or the enhanced BSR is reported only when all data or all remaining data in a logical channel group of B-UE is placed into the current MAC PDU, and/or new data, to be sent, of B-UE arrives; in addition, the reporting time may further be determined in another manner.

An enhanced BSR needs to be reported at the reporting time determined within the non-periodic reporting time. The reason is: in a process of transmitting data in the current time and before a periodic reporting time of a next enhanced BSR is reached, if new data (which is data sent by B-UE except the B-UE in FIG. 3, for example, B-UE 4) of B-UE appears or sending of data in a logical channel group of B-UE is completed after the MAC PDU of the current time is transmitted, in this case, the eNB does not know that the sending of data of B-UE buffered on the side of the S-UE is about to be completed or the new data of the B-UE is received on the side of the S-UE. Therefore, the enhanced BSR needs to be reported once, to enable the eNB to redefine priorities of remaining B-UEs or priorities of remaining B-UEs and newly added B-UEs.

Figure 9:
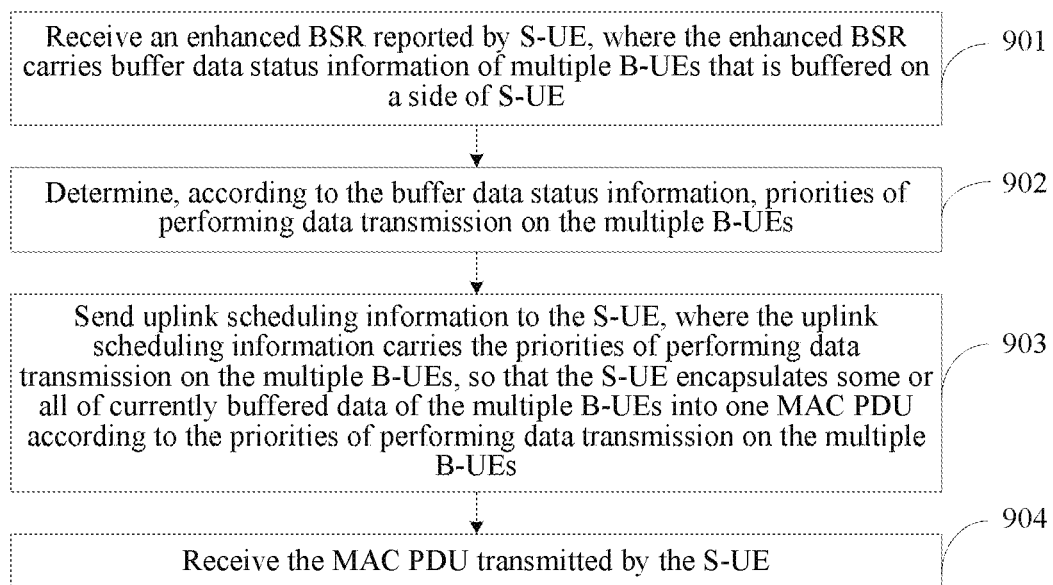
FIG. 9 is a schematic flowchart of Embodiment 3 of a priority scheduling method according to an embodiment of the present invention.

As shown in FIG. 9, FIG. 9 is a schematic flowchart of Embodiment 3 of a priority scheduling method according to an embodiment of the present invention. Steps of implementing the method on a side of an eNB include:

Step 901: An eNB receives an enhanced BSR reported by S-UE, where the enhanced BSR carries buffer data status information of multiple B-UEs buffered by the S-UE.

Step 902: The eNB determines, according to the buffer data status information, priorities of performing data transmission on the multiple B-UEs.

In step 902, the priorities of the multiple B-UEs can be scheduled in the following manner: determining, in the multiple B-UEs, one or more B-UEs of a first priority according to the buffer data status information, and determining that another B-UE except the B-UE of a first priority is B-UE of a second priority, where a priority level of the first priority is higher than a priority level of the second priority; and when it is determined that multiple B-UEs of a first priority exist, determining priorities of the multiple B-UEs of a first priority.

For the convenience of understanding, content of step 902 is described below by using an example.

The eNB acquires an average rate of data transmission between B-UE and the eNB within a set historical time period (for example, the current time is 7:00, and the historical time period is 6:30 to 7:00) according to different data status information of B-UEs, and uses the average transmission rate as a parameter for evaluating B-UE of a first priority. The eNB may further set a maximum delay (for example, during webpage browsing, a maximum delay for acquiring a webpage is set to 30 seconds) for a different service corresponding to each B-UE, and uses the maximum delay as a parameter for evaluating B-UE of a first priority. Certainly, another parameter except the average transmission rate and the maximum delay may further be included, and B-UE of a first priority is determined according to these parameters together.

In order to determine priorities of multiple B-UEs of a first priority, one or more B-UEs of a first priority can be chosen according to one or more parameters for determining B-UE of a first priority. When multiple B-UEs of a first priority are chosen, priority levels of B-UEs of a first priority in multiple B-UEs of a first priority may be determined according to these parameters.

Detailed descriptions are given below by using an example in which B-UE of a first priority is chosen or priority levels of B-UEs of a first priority are determined according to an average transmission rate and a maximum delay.

First, an average transmission rate of service data of each B-UE within a set historical time period is acquired, a rate is set for each service according to different services, the average transmission rate of each B-UE is compared with a corresponding set rate, and B-UE whose average transmission rate is less than the set rate is set as B-UE of a first priority. If multiple B-UEs of a first priority are obtained by screening according to the average transmission rate, priorities of B-UEs of a first priority can be determined by using one of the following methods: In one method, average transmission rates of B-UEs of a first priority are compared, and priority levels of the B-UEs of a first priority are defined in an ascending order. In another method: a maximum delay of a service of each B-UE of a first priority is acquired, a delay is set for each service according to different services, and the maximum delay of each B-UE of a first priority is compared with a corresponding set delay. For example, when there are two B-UEs of a first priority, time periods to reach the maximum delays of data to be transmitted of the two B-UEs of a first priority are 10 seconds and 20 seconds separately, and in this case, it can be set that a priority of the B-UE, of a first priority, having 10 seconds to reach the maximum delay is higher than a priority of the B-UE, of a first priority, having 20 seconds to reach the maximum delay. Certainly, when the priorities of the B-UEs of a first priority are determined, only one of the parameters is considered, or the foregoing two parameters may further be comprehensively considered.

In addition, one or more B-UEs of a first priority may further be determined in all B-UEs by using the maximum delay, and priorities of the B-UEs of a first priority are then determined according to the maximum delays and/or the average transmission rates.

Only scheduling of priorities of all B-UEs according to parameters such as an average transmission rate and a maximum delay is described above, and in addition, scheduling may be further performed according to another parameter, which is not described one by one herein again.

Step 903: Send uplink scheduling information to the S-UE, where the uplink scheduling information carries the priorities of performing data transmission on the multiple B-UEs, so that the S-UE encapsulates some or all of currently buffered data of the multiple B-UEs into one MAC PDU according to the priorities of performing data transmission on the multiple B-UEs.

Step 904: The eNB receives the MAC PDU transmitted by the S-UE.

In addition, when receiving the MAC PDU transmitted by the S-UE, the eNB determines whether an enhanced BSR reported by the S-UE is received again, and in this case, the ENB can continue to execute the step of "sending uplink scheduling information to the S-UE" in step 903, to enable the eNB to schedule the data of B-UE that is buffered on a side of the S-UE and is not transmitted.

In addition, this embodiment further includes: after acquiring the enhanced BSR, allocating, by the eNB, an uplink resource to the S-UE according to conditions of data, which is buffered on the side of the S-UE and carried by the enhanced BSR, of each B-UE, so that the S-UE determines, according to the allocated uplink resource, a volume of data to be transmitted each time, where the volume of data to be transmitted each time is a volume of data encapsulated in the MAC PDU each time.

Figure 10:
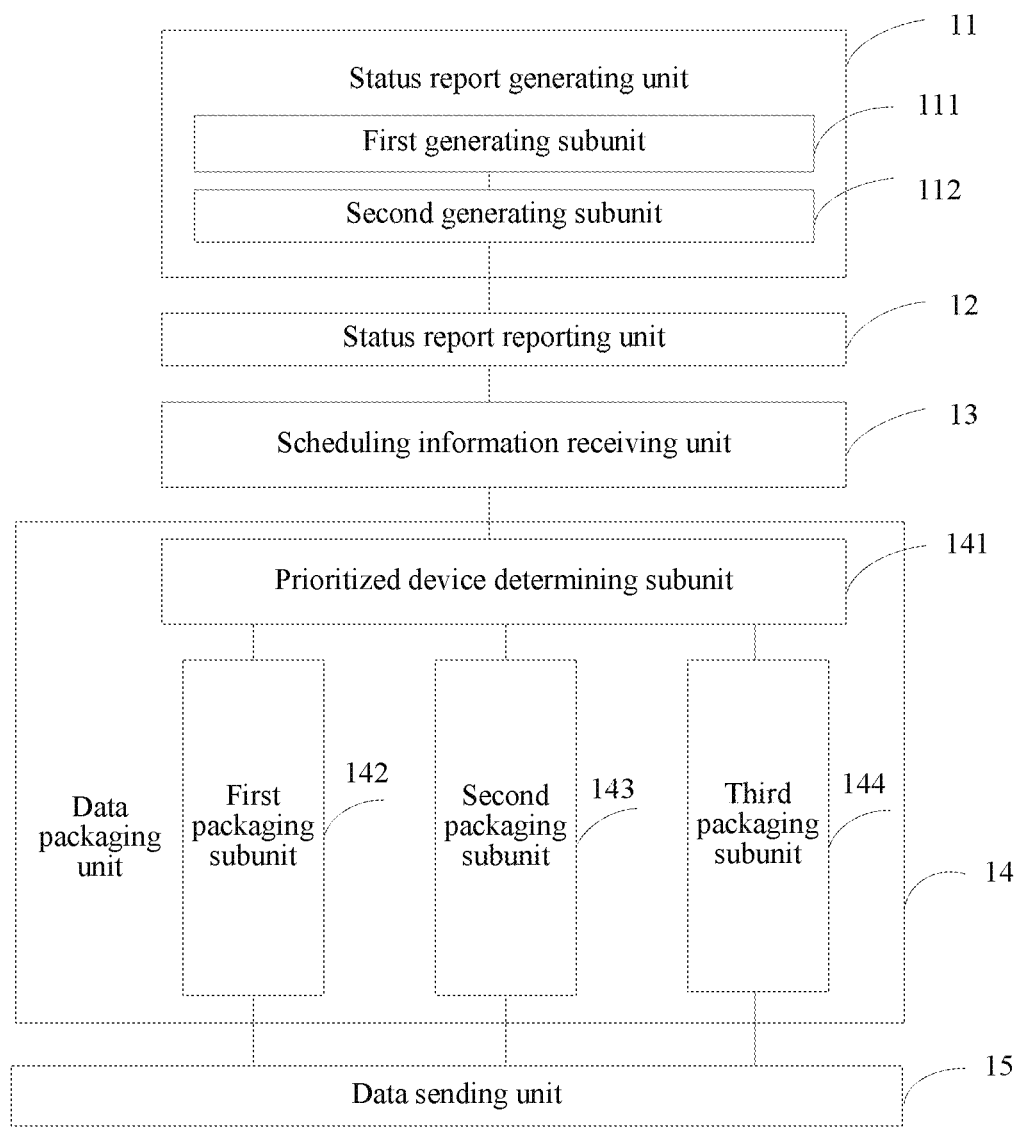
FIG. 10 is a schematic structural diagram of Embodiment 1 of user equipment according to an embodiment of the present invention.

Corresponding to Embodiment 1 of the method on the side of S-UE, as shown in FIG. 10, an embodiment of the present invention further provides a schematic structural diagram of Embodiment 1 of user equipment. The user equipment 100 includes:

a status report generating unit 11, configured to generate an enhanced buffer status report BSR according to buffered data information of multiple B-UEs;

a status report reporting unit 12, configured to report, to a base station eNB, the enhanced BSR generated by the status report generating unit 11, where the enhanced BSR carries buffer data status information of each B-UE, so that the eNB determines, according to the buffer data status information, priorities of performing data transmission on the multiple B-UEs;

a scheduling information receiving unit 13, configured to: after the status report receiving unit reports the enhanced BSR, receive uplink scheduling information delivered by the eNB, where the uplink scheduling information carries the priorities of performing data transmission on the multiple B-UEs;

a data packaging unit 14, configured to encapsulate some or all of currently buffered data of the multiple B-UEs into one MAC PDU according to the priorities, received by the scheduling information receiving unit 13, of performing data transmission on the multiple B-UEs; and a data sending unit 15, configured to transmit, to the eNB, the MAC PDU obtained by packaging by the data packaging unit 14.

The status report generating unit 11 includes:

a first generating subunit 111, configured to generate a UE index that corresponds to each B-UE one by one, and generate, according to the buffered data information of the multiple B-UEs, a conventional BSR that corresponds to each UE index one by one, where the conventional BSR includes buffer data status information of corresponding B-UE; and a second generating subunit 112, configured to generate the enhanced BSR that includes the UE index that corresponds to each B-UE one by one and the conventional BSR that corresponds to each UE index one by one, where the UE index and the conventional BSR are generated by the first generating subunit 111. The UE index includes an extension field, a type field, and a B-UE identifier, where the extension field is used to indicate whether there is a next UE index after the current UE index; the type field is used to identify a type of a conventional BSR corresponding to the current UE index; and the B-UE identifier is used to identify a correspondence between the current B-UE and an index number of the current B-UE.

The data packaging unit 14 includes:

a prioritized device determining subunit 141, configured to determine B-UE of a first priority and B-UE of a second priority according to the priorities of performing data transmission on the multiple B-UEs, where a priority level of the first priority is higher than a priority level of the second priority;

a first packaging subunit 142, configured to: when the prioritized device determining subunit 141 determines that only one B-UE of a first priority exists, place, into a MAC PDU to be sent, data in a token bucket corresponding to each logical channel of the one B-UE of a first priority, and when storage space of the MAC PDU is not filled with the data of the one B-UE of a first priority, pad, according to an order of logical channel priorities, remaining space of the MAC PDU with data in token buckets corresponding to all B-UEs of a second priority;

a second packaging subunit 143, configured to: when the prioritized device determining subunit 141 determines that multiple B-UEs of a first priority exist, determine priorities of the multiple B-UEs of a first priority according to the priorities of performing data transmission on the multiple B-UEs, sequentially place, according to a priority order into a MAC PDU to be sent, data in a token bucket corresponding to each logical channel of the multiple B-UEs of a first priority, and when storage space of the MAC PDU is not filled with the data of the multiple B-UEs of a first priority, pad, according to an order of logical channel priorities, remaining space of the MAC PDU with data in token buckets corresponding to all B-UEs of a second priority; and a third packaging subunit 144, configured to: when the prioritized device determining subunit 141 determines that only the B-UE of a second priority exists, place, according to an order of logical channel priorities into a MAC PDU to be sent, data in token buckets corresponding to all B-UEs of a second priority.

The first packaging subunit 142 or the second packaging subunit 143 is specifically configured to place, according to the order of logical channel priorities, data of each B-UE of a first priority into the MAC PDU to be sent.

Figure 11:
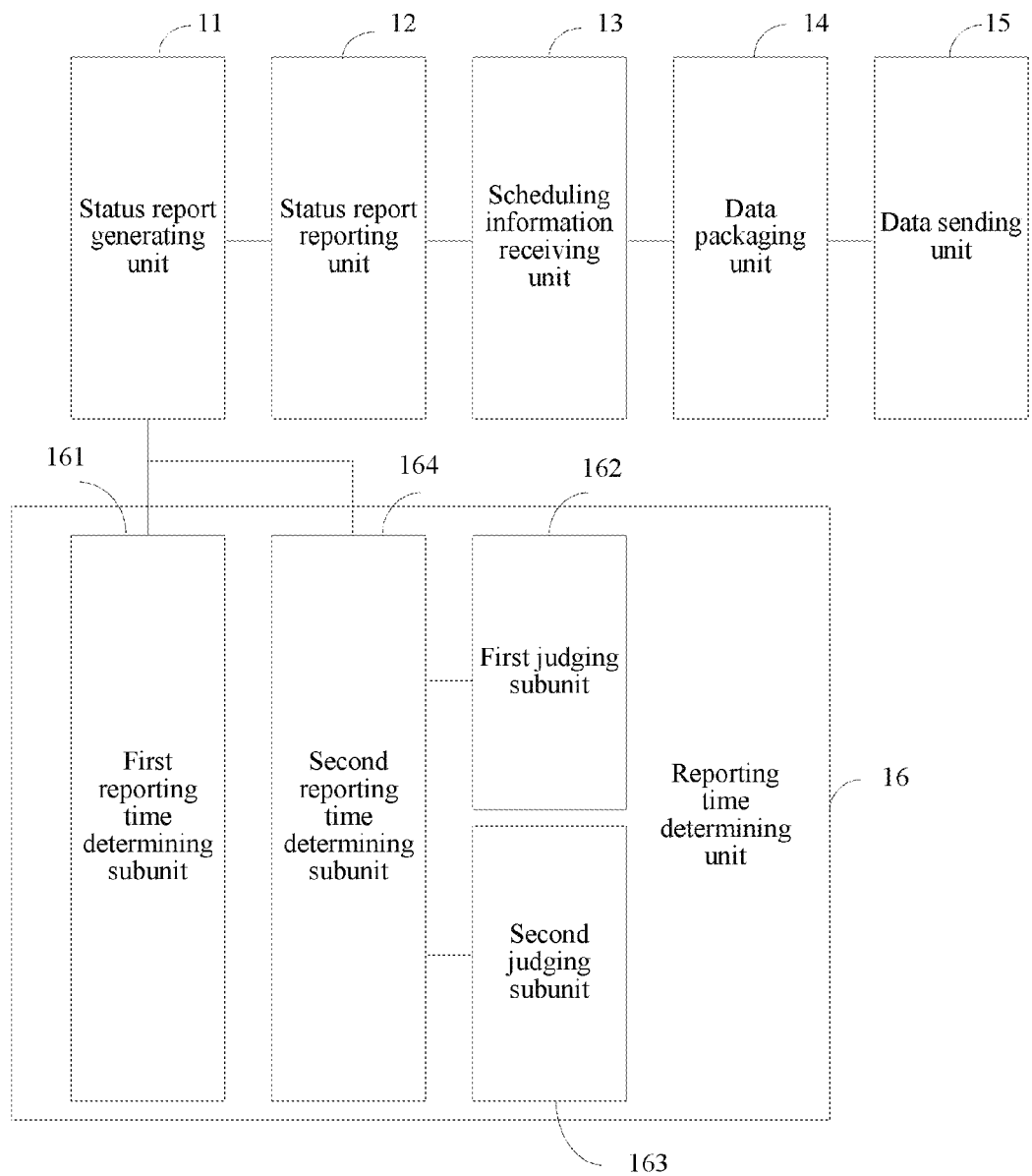
FIG. 11 is a schematic structural diagram of Embodiment 2 of user equipment according to an embodiment of the present invention.

Corresponding to Embodiment 2 of the method on the side of S-UE, as shown in FIG. 11, an embodiment of the present invention further provides a schematic structural diagram of Embodiment 2 of user equipment. Based on Embodiment 1 of the user equipment, the user equipment 100 further includes:

a reporting time determining unit 16, configured to determine a reporting time of the enhanced BSR, so that the status report reporting unit reports the enhanced BSR at the reporting time.

The reporting time determining unit 16 includes:

a first reporting time determining subunit 161, configured to set a periodic reporting time of the enhanced BSR;

a first judging subunit 162, configured to determine, within a non-periodic reporting time, whether all data or all remaining data in each logical channel group of B-UE is placed into the current MAC PDU;

a second judging subunit 163, configured to determine, within a non-periodic reporting time, whether new data, to be sent, of B-UE arrives; and a second reporting time determining subunit 164, configured to: when the first judging subunit 162 determines that all data or all remaining data in a logical channel group of B-UE is placed into the current MAC PDU, and/or the second judging subunit 163 determines that new data, to be sent, of B-UE arrives, determine that a same moment of transmitting the current MAC PDU is the reporting time of the enhanced BSR.

In hardware implementation, the foregoing modules may be, in a form of hardware, embedded into or independent of a processor of a base station, or may be stored in a form of software in a terminal such as a memory of UE, so that the processor invokes the modules to perform operations corresponding to the modules. The processor may be a central processing unit (CPU), a microprocessor, a single-chip microcomputer, or the like. The user equipment shown in FIG. 10 or FIG. 11 can perform corresponding steps in the foregoing embodiments, and for details, reference may be made to the descriptions of the foregoing embodiments. For effects achieved by the user equipment shown in FIG. 10 or FIG. 11, reference may also be made to the foregoing embodiments.

Figure 12:
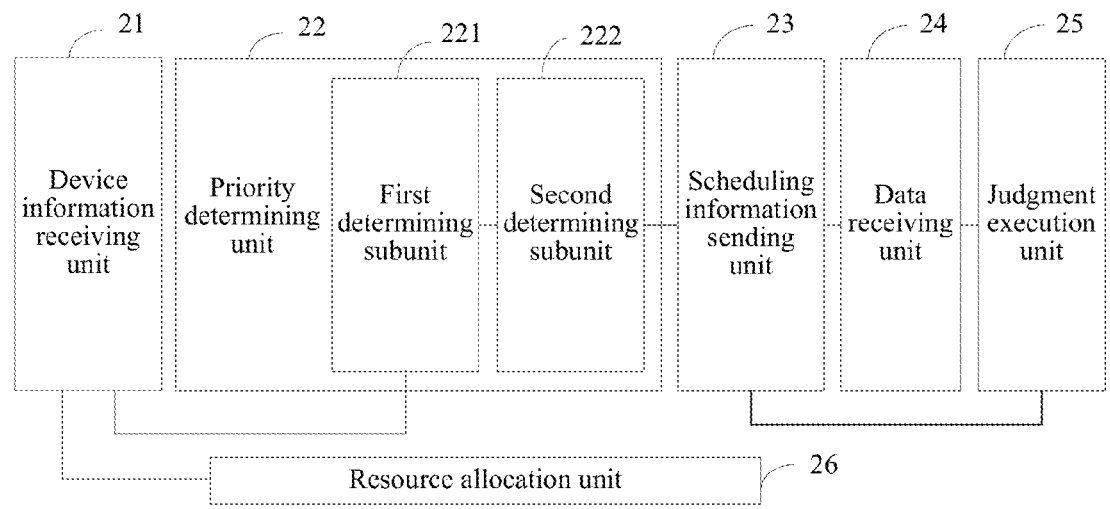
FIG. 12 is a schematic structural diagram of a base station according to an embodiment of the present invention.

Corresponding to the embodiment of the method on the side of an eNB, an embodiment of the present invention further provides an embodiment of a base station. As shown in FIG. 12, the base station 200 includes:

a device information receiving unit 21, configured to receive an enhanced BSR reported by supporting user equipment S-UE, where the enhanced BSR carries buffer data status information of multiple B-UEs buffered by the S-UE;

a priority determining unit 22, configured to determine, according to the buffer data status information received by the device information receiving unit 21, priorities of performing data transmission on the multiple B-UEs;

a scheduling information sending unit 23, configured to send uplink scheduling information to the S-UE, where the uplink scheduling information carries the priorities, determined by the priority determining unit 22, of performing data transmission on the multiple B-UEs, so that the S-UE encapsulates some or all of currently buffered data of the multiple B-UEs into one MAC PDU according to the priorities of performing data transmission on the multiple B-UEs; and a data receiving unit 24, configured to receive the MAC PDU transmitted by the S-UE.

The priority determining unit 22 includes:

a first determining subunit 221, configured to determine, in the multiple B-UEs, one or more B-UEs of a first priority according to the buffer data status information, and determine that another B-UE except the B-UE of a first priority is B-UE of a second priority, where a priority level of the first priority is higher than a priority level of the second priority; and a second determining subunit 222, configured to: when the first determining subunit 221 determines that multiple B-UEs of a first priority exist, determine priorities of the multiple B-UEs of a first priority.

In addition, the base station 200 further includes:

a judging execution unit 25, configured to: when the data receiving unit 24 receives the MAC PDU transmitted by the S-UE, determine whether the enhanced BSR reported by the S-UE is received, and if not, continue to execute, by using the scheduling information sending unit 23, the step of sending uplink scheduling information to the S-UE; and a resource allocation unit 26, configured to allocate an uplink resource to the S-UE, so that the S-UE determines, according to the allocated uplink resource, a volume of data to be transmitted each time, where a volume of data to be transmitted each time is a volume of data encapsulated in the MAC PDU each time.

In hardware implementation, the foregoing modules may be, in a form of hardware, embedded into or independent of a processor of a base station, or may be stored in a form of software in a terminal such as a memory of UE, so that the processor invokes the modules to perform operations corresponding to the modules. The processor may be a central processing unit (CPU), a microprocessor, a single-chip microcomputer, or the like. The base station shown in FIG. 12 can perform corresponding steps in the foregoing embodiments, and for details, reference may be made to the descriptions of the foregoing embodiments. For effects achieved by the base station shown in FIG. 12, reference may also be made to the foregoing embodiments.

Further, an embodiment of the present invention further provides structures of the user equipment 100 and the base station 200 separately. The user equipment and base station can include a transmitter, a receiver, a processor, at least one network interface or another communications interface, a memory, and at least one communications bus configured to implement connection and communication between these apparatuses. The transmitter is configured to send data, the receiver is configured to receive data, and the processor is configured to execute an executable module, for example, a computer program, stored in the memory. The memory may include a high speed random access memory (RAM, Random Access Memory), and may further include a non-volatile memory (non-volatile memory), for example, at least one magnetic disk storage. Communication and connection between a system gate and at least one other network element may be implemented by using the at least one network interface (which may be wired or wireless), the Internet, a wide area network, a local area network, a metropolitan area network, and the like.

Figure 13:
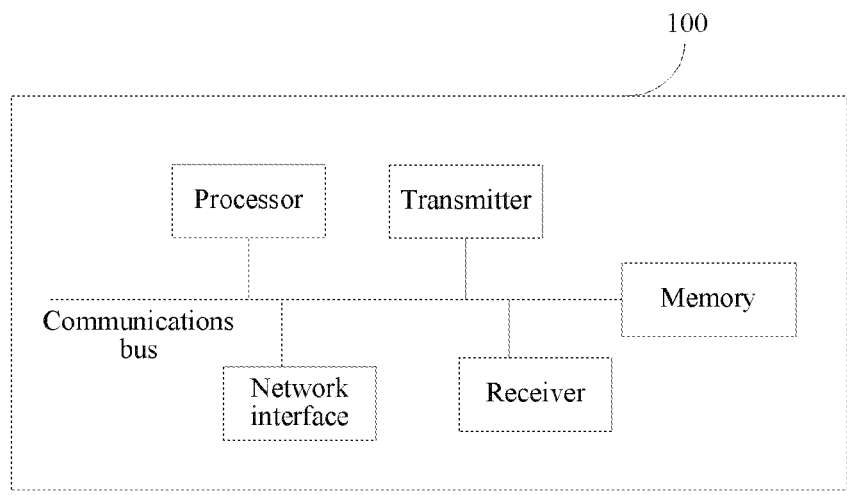
FIG. 13 is a schematic structural diagram of user equipment according to an embodiment of the present invention.

Referring to a schematic structural diagram of user equipment 100 shown in FIG. 13, in some implementation manners, a memory stores a program instruction, and the program instruction may be executed by a processor, a transmitter, and a receiver.

The processor is configured to generate an enhanced buffer status report BSR according to buffered data information of multiple B-UEs. The processor is specifically configured to generate a UE index that corresponds to each B-UE one by one, and generate, according to the buffered data information of the multiple B-UEs, a conventional BSR that corresponds to each UE index one by one, where the conventional BSR includes buffer data status information of corresponding B-UE; and generate the enhanced BSR that includes the UE index that corresponds to each B-UE one by one and the conventional BSR that corresponds to each UE index one by one. The UE index generated by the processor includes an extension field, a type field, and a B-UE identifier, where the extension field is used to indicate whether there is a next UE index after the current UE index; the type field is used to identify a type of a conventional BSR corresponding to the current UE index; and the B-UE identifier is used to identify a correspondence between the current B-UE and an index number of the current B-UE.

The transmitter is configured to report, to a base station eNB, the enhanced BSR generated by the processor, where the enhanced BSR carries buffer data status information of each B-UE, so that the eNB determines, according to the buffer data status information, priorities of performing data transmission on the multiple B-UEs.

The receiver is configured to: after the transmitter sends the enhanced BSR, receive uplink scheduling information delivered by the eNB, where the uplink scheduling information carries the priorities of performing data transmission on the multiple B-UEs.

The processor is configured to encapsulate some or all of currently buffered data of the multiple B-UEs into a MAC PDU according to the priorities, received by the receiver, of performing data transmission on the multiple B-UEs. The processor is specifically configured to determine B-UE of a first priority and B-UE of a second priority according to the priorities of performing data transmission on the multiple B-UEs, where a priority level of the first priority is higher than a priority level of the second priority; and when it is determined that only one B-UE of a first priority exists, place, into a MAC PDU to be sent, data in a token bucket corresponding to each logical channel of the one B-UE of a first priority, and when storage space of the MAC PDU is not filled with the data of the one B-UE of a first priority, pad, according to an order of logical channel priorities, remaining space of the MAC PDU with data in token buckets corresponding to all B-UEs of a second priority; or when it is determined that multiple B-UEs of a first priority exist, determine priorities of the multiple B-UEs of a first priority according to the priorities of performing data transmission on the multiple B-UEs, sequentially place, according to a priority order into a MAC PDU to be sent, data in a token bucket corresponding to each logical channel of the multiple B-UEs of a first priority, and when storage space of the MAC PDU is not filled with the data of the multiple B-UEs of a first priority, pad, according to an order of logical channel priorities, remaining space of the MAC PDU with data in token buckets corresponding to all B-UEs of a second priority; or when it is determined that only the B-UE of a second priority exists, place, according to an order of logical channel priorities into a MAC PDU to be sent, data in token buckets corresponding to all B-UEs of a second priority. The processor is specifically configured to place, according to the order of logical channel priorities, data of each B-UE of a first priority into the MAC PDU to be sent.

The transmitter is configured to transmit a MAC PDU obtained by packaging by the processor to the eNB.

The processor is further configured to determine a reporting time of the enhanced BSR, so that the status report reporting unit reports the enhanced BSR at the reporting time. The processor is specifically configured to set a periodic reporting time of the enhanced BSR; determine, within a non-periodic reporting time, whether all data or all remaining data in each logical channel group of B-UE is placed into the current MAC PDU; determine, within a non-periodic reporting time, whether new data, to be sent, of B-UE arrives; and when it is determined that all data or all remaining data in a logical channel group of B-UE is placed into the current MAC PDU, and/or it is determined that new data, to be sent, of B-UE arrives, determine that a same moment of transmitting the current MAC PDU is the reporting time of the enhanced BSR.

Figure 14:
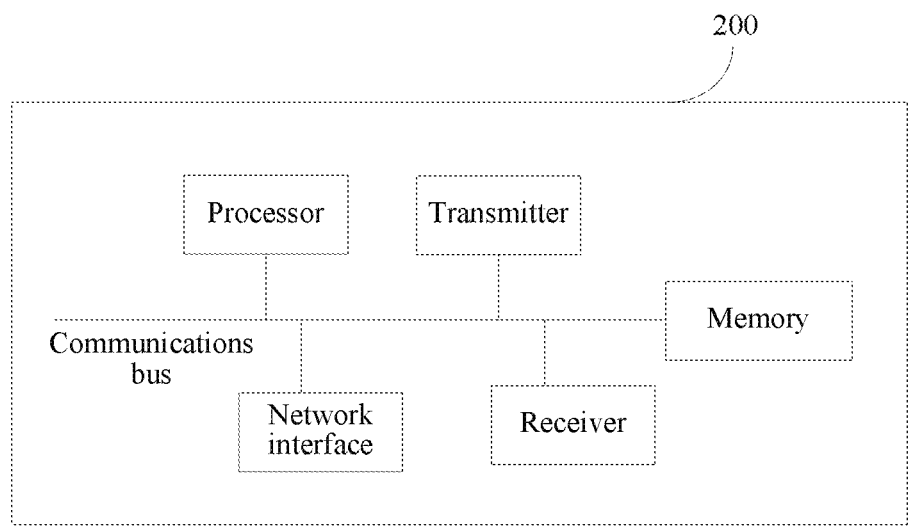
FIG. 14 is a schematic structural diagram of a base station according to an embodiment of the present invention.

Referring to a schematic structural diagram of a base station 200 shown in FIG. 14, in some implementation manners, a memory stores a program instruction, and the program instruction may be executed by a processor, a transmitter, and a receiver.

The receiver is configured to receive an enhanced BSR reported by supporting user equipment S-UE, where the enhanced BSR carries buffer data status information of multiple B-UEs buffered by the S-UE.

The processor is configured to determine, according to the buffer data status information, priorities of performing data transmission on the multiple B-UEs. The processor is specifically configured to determine, in the multiple B-UEs, one or more B-UEs of a first priority according to the buffer data status information, and determine that another B-UE except the B-UE of a first priority is B-UE of a second priority, where a priority level of the first priority is higher than a priority level of the second priority; and when it is determined that multiple B-UEs of a first priority exist, determine priorities of the multiple B-UEs of a first priority.

The transmitter is configured to send uplink scheduling information to the S-UE, where the uplink scheduling information carries the priorities, determined by the processor, of performing data transmission on the multiple B-UEs, so that the S-UE encapsulates some or all of currently buffered data of the multiple B-UEs into one MAC PDU according to the priorities of performing data transmission on the multiple B-UEs.

The receiver is configured to receive the MAC PDU transmitted by the S-UE.

The processor is further configured to: at the same time when the receiver receives the MAC PDU transmitted by the S-UE, determine whether the enhanced BSR reported by the S-UE is received, and if not, continue to execute, by using the transmitter, the step of sending uplink scheduling information to the S-UE.

The processor is further configured to allocate an uplink resource to the S-UE, so that the S-UE determines, according to the allocated uplink resource, a volume of data to be transmitted each time.

It should be noted that, the device shown in FIG. 13 may be configured to implement any method provided, in the foregoing method embodiments, about the user equipment, and the device shown in FIG. 14 may be configured to implement any method, provided in the foregoing method embodiments, about the base station, which are not described herein again.

According to the priority scheduling method, the user equipment, and the base station that are provided in the embodiments of the present invention, when data of multiple B-UEs converges on S-UE, the S-UE notifies, in a manner of reporting an enhanced BSR to an eNB, conditions of data sent by B-UEs that is buffered by the S-UE, the eNB schedules sending priorities of the B-UEs according to data buffer conditions of the B-UEs, and the S-UE then packages the data of the B-UEs according to priorities and based on a scheduling result delivered by the eNB, and uploads the data to the eNB. By scheduling the priorities of the B-UEs, a packet uploaded each time includes data of only one B-UE, or includes data of multiple B-UEs; data of all B-UEs is sent in different priority orders in batches. Moreover, based on a different data volume, buffered in the S-UE, of data of each B-UE, the data of each B-UE is also sent in different batches, and data of B-UE of a high priority is sent first in early batches. During this period, some or all data of B-UE of a relatively low priority is also sent; that is, when the data of the B-UE of a high priority is sent preferentially, some data of the B-UE of a relatively low priority is also sent. Therefore, data transmission rates of B-UEs can be fairly considered, a case in which continuous uploading of data of some B-UEs keeps data of other B-UEs in a wait state for a long time is avoided, and fairness and flexibility are ensured.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objects of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A priority scheduling method, comprising:
    generating an enhanced buffer status report (BSR) according to buffered data information of multiple benefitted user equipments B-UEs, and reporting the enhanced BSR to a base station eNB, wherein the enhanced BSR carries buffer data status information of the multiple B-UEs, so that the eNB determines, according to the buffer data status information, priorities of performing data transmission on the multiple B-UEs;
    receiving, by a supporting user equipment (S-UE), uplink scheduling information delivered by from the eNB, wherein the uplink scheduling information carries the priorities of performing data transmission on the multiple B-UEs; and
    encapsulating, by the S-UE, some or all of currently buffered data of the multiple B-UEs into one MAC PDU according to the priorities of performing data transmission on the multiple B-UEs, and transmitting the MAC PDU to the eNB.

2. The method according to claim 1, wherein the generating an enhanced buffer status report BSR according to buffered data information of multiple benefitted user equipments B-UEs comprises:
    generating a UE index that corresponds to each B-UE one by one, and generating, according to the buffered data information of the multiple B-UEs, a conventional BSR that corresponds to each UE index one by one, wherein the conventional BSR comprises buffer data status information of corresponding B-UE; and
    generating the enhanced BSR that comprises the UE index that corresponds to each B-UE one by one and the conventional BSR that corresponds to each UE index one by one.

3. The method according to claim 2, wherein the UE index comprises an extension field, a type field, and a B-UE identifier, wherein
    the extension field is used to indicate whether there is a next UE index after the current UE index;
    the type field is used to identify a type of a conventional BSR corresponding to the current UE index; and
    the B-UE identifier is used to identify a correspondence between the current B-UE and an index number of the current B-UE.

4. The method according to claim 1, wherein the encapsulating some or all of currently buffered data of the multiple B-UEs into one MAC PDU according to the priorities of performing data transmission on the multiple B-UEs comprises:
  determining B-UE of a first priority and B-UE of a second priority according to the priorities of performing data transmission on the multiple B-UEs, wherein a priority level of the first priority is higher than a priority level of the second priority; and
  if it is determined that only one B-UE of a first priority exists, placing, into a MAC PDU to be sent, data in a token bucket corresponding to each logical channel of the one B-UE of a first priority, and when storage space of the MAC PDU is not filled with the data of the one B-UE of a first priority, padding, according to an order of logical channel priorities, remaining space of the MAC PDU with data in token buckets corresponding to all B-UEs of a second priority; or
  if it is determined that multiple B-UEs of a first priority exist, determining priorities of the multiple B-UEs of a first priority according to the priorities of performing data transmission on the multiple B-UEs, sequentially placing, according to a priority order into a MAC PDU to be sent, data in a token bucket corresponding to each logical channel of the multiple B-UEs of a first priority, and when storage space of the MAC PDU is not filled with the data of the multiple B-UEs of a first priority, padding, according to an order of logical channel priorities, remaining space of the MAC PDU with data in token buckets corresponding to all B-UEs of a second priority; or
  if it is determined that only the B-UE of a second priority exists, placing, according to an order of logical channel priorities into a MAC PDU to be sent, data in token buckets corresponding to all B-UEs of a second priority.

5. The method according to claim 4, wherein the placing, into a MAC PDU to be sent, data in a token bucket corresponding to each logical channel of the B-UE of a first priority comprises:
  placing, according to the order of logical channel priorities, data of each B-UE of a first priority into the MAC PDU to be sent.

6. The method according to claim 1, wherein the method further comprises:
  determining a reporting time of the enhanced BSR, so as to report the enhanced BSR at the reporting time.

7. The method according to claim 6, wherein the determining a reporting time of the enhanced BSR comprises:
  setting a periodic reporting time of the enhanced BSR; or
  within a non-periodic reporting time, if all data or all remaining data in a logical channel group of B-UE is placed into the current MAC PDU, and/or new data, to be sent, of B-UE arrives, determining that a same moment of transmitting the current MAC PDU is the reporting time of the enhanced BSR.

8. A priority scheduling method, comprising:
  generating by supporting user equipment (S-UE) an enhanced buffer status report (BSR) according to buffered data information of multiple benefitted user equipments B-UEs buffered by the S-UE, and reporting the enhanced BSR to a base station eNB, wherein the enhanced BSR carries buffer data status information of the multiple B-UEs;
  receiving the enhanced BSR reported by the supporting user equipment (S-UE), wherein the enhanced BSR carries the buffer data status information of the multiple B-UEs buffered by the S-UE;
  determining, by the eNB and according to the buffer data status information, priorities of performing data transmission on the multiple B-UEs;
  sending, by the eNB, uplink scheduling information to the S-UE, wherein the uplink scheduling information carries the priorities of performing data transmission on the multiple B-UEs, so that the S-UE encapsulates some or all of currently buffered data of the multiple B-UEs into one MAC PDU according to the priorities of performing data transmission on the multiple B-UEs;
  receiving, by the S-UE, the uplink scheduling information delivered from the eNB, wherein the uplink scheduling information carries the priorities of performing data transmission on the multiple B-UEs;
  encapsulating, by the S-UE, some or all of currently buffered data of the multiple B-UEs into one MAC PDU according to the priorities of performing data transmission on the multiple B-UEs, and transmitting, by the S-UE, the MAC PDU to the eNB; and
  receiving, by the eNB, the MAC PDU transmitted by the S-UE.

9. The method according to claim 8, wherein the method further comprises:
  when the MAC PDU transmitted by the S-UE is received, determining at the same time whether the enhanced BSR reported by the S-UE is received, and if not, continuing to execute the step of sending uplink scheduling information to the S-UE.

10. The method according to claim 8, wherein the determining, according to the buffer data status information, priorities of performing data transmission on the multiple B-UEs comprises:
  determining, in the multiple B-UEs, one or more B-UEs of a first priority according to the buffer data status information, and determining that another B-UE except the B-UE of a first priority is B-UE of a second priority, wherein a priority level of the first priority is higher than a priority level of the second priority; and
  when it is determined that multiple B-UEs of a first priority exist, determining priorities of the multiple B-UEs of a first priority.

11. The method according to claim 8, wherein the method further comprises:
  allocating an uplink resource to the S-UE, so that the S-UE determines, according to the allocated uplink resource, a volume of data to be transmitted each time.

12. User equipment, comprising:
  a status report generating unit, configured to generate an enhanced buffer status report (BSR) according to buffered data information of multiple B-UEs;
  a status report reporting unit, configured to report, to a base station eNB, the enhanced BSR generated by the status report generating unit, wherein the enhanced BSR carries buffer data status information of each B-UE, so that the eNB determines, according to the buffer data status information, priorities of performing data transmission on the multiple B-UEs;
  a scheduling information receiving unit, configured to: after the status report reporting unit reports the enhanced BSR, receive uplink scheduling information delivered from the eNB, wherein the uplink scheduling information carries the priorities of performing data transmission on the multiple B-UEs;
  a data packaging unit, configured to encapsulate some or all of currently buffered data of the multiple B-UEs into one MAC PDU according to the priorities, received by the scheduling information receiving unit, of performing data transmission on the multiple B-UEs; and a data sending unit, configured to transmit, to the eNB, the MAC PDU obtained by packaging by the data packaging unit.

13. The user equipment according to claim 12, wherein the status report generating unit comprises:

a first generating subunit, configured to generate a UE index that corresponds to each B-UE one by one, and generate, according to the buffered data information of the multiple B-UEs, a conventional BSR that corresponds to each UE index one by one, wherein the conventional BSR comprises buffer data status information of corresponding B-UE, the UE index comprises an extension field, a type field, and a B-UE identifier, wherein the extension field is used to indicate whether there is a next UE index after the current UE index; the type field is used to identify a type of a conventional BSR corresponding to the current UE index; and the B-UE identifier is used to identify a correspondence between the current B-UE and an index number of the current B-UE; and a second generating subunit, configured to generate the enhanced BSR that comprises the UE index that corresponds to each B-UE one by one and the conventional BSR that corresponds to each UE index one by one, wherein the UE index and the conventional BSR are generated by the first generating subunit.

14. The user equipment according to claim 12, wherein the data packaging unit comprises:

a prioritized device determining subunit, configured to determine B-UE of a first priority and B-UE of a second priority according to the priorities of performing data transmission on the multiple B-UEs, wherein a priority level of the first priority is higher than a priority level of the second priority;

a first packaging subunit, configured to: when the prioritized device determining subunit determines that only one B-UE of a first priority exists, place, into a MAC PDU to be sent, data in a token bucket corresponding to each logical channel of the one B-UE of a first priority, and when storage space of the MAC PDU is not filled with the data of the one B-UE of a first priority, pad, according to an order of logical channel priorities, remaining space of the MAC PDU with data in token buckets corresponding to all B-UEs of a second priority;

a second packaging subunit, configured to: when the prioritized device determining subunit determines that multiple B-UEs of a first priority exist, determine priorities of the multiple B-UEs of a first priority according to the priorities of performing data transmission on the multiple B-UEs, sequentially place, according to a priority order into a MAC PDU to be sent, data in a token bucket corresponding to each logical channel of the multiple B-UEs of a first priority, and when storage space of the MAC PDU is not filled with the data of the multiple B-UEs of a first priority, pad, according to an order of logical channel priorities, remaining space of the MAC PDU with data in token buckets corresponding to all B-UEs of a second priority; and a third packaging subunit, configured to: when the prioritized device determining subunit determines that only the B-UE of a second priority exists, place, according to an order of logical channel priorities into a MAC PDU to be sent, data in token buckets corresponding to all B-UEs of a second priority.

15. The user equipment according to claim 14, wherein the first packaging subunit or the second packaging subunit is specifically configured to place, according to the order of logical channel priorities, data of each B-UE of a first priority into the MAC PDU to be sent.

16. The user equipment according to claim 12, wherein the user equipment further comprises:

a reporting time determining unit, configured to determine a reporting time of the enhanced BSR, so that the status report reporting unit reports the enhanced BSR at the reporting time.

17. The user equipment according to claim 16, wherein the reporting time determining unit comprises:

a first reporting time determining subunit, configured to set a periodic reporting time of the enhanced BSR;

a first judging subunit, configured to determine, within a non-periodic reporting time, whether all data or all remaining data in each logical channel group of B-UE is placed into the current MAC PDU;

a second judging subunit, configured to determine, within a non-periodic reporting time, whether new data, to be sent, of B-UE arrives; and a second reporting time determining subunit, configured to: when the first judging subunit determines that all data or all remaining data in a logical channel group of B-UE is placed into the current MAC PDU, and/or the second judging subunit determines that new data, to be sent, of B-UE arrives, determine that a same moment of transmitting the current MAC PDU is the reporting time of the enhanced BSR.

18. A system, comprising:

a base station; and user equipment, comprising:

a status report generating unit, configured to generate an enhanced buffer status report (BSR) according to buffered data information of multiple B-UEs;

a status report reporting unit, configured to report, to a base station eNB, the enhanced BSR generated by the status report generating unit, wherein the enhanced BSR carries buffer data status information of each B-UE, so that the eNB determines, according to the buffer data status information, priorities of performing data transmission on the multiple B-UEs;

a scheduling information receiving unit, configured to: after the status report reporting unit reports the enhanced BSR, receive uplink scheduling information delivered from the eNB, wherein the uplink scheduling information carries the priorities of performing data transmission on the multiple B-UEs;

a data packaging unit, configured to encapsulate some or all of currently buffered data of the multiple B-UEs into one MAC PDU according to the priorities, received by the scheduling information receiving unit, of performing data transmission on the multiple B-UEs; and a data sending unit, configured to transmit, to the eNB, the MAC PDU obtained by packaging by the data packaging unit; and the base station comprising:

a device information receiving unit, configured to receive the enhanced BSR reported by supporting user equipment (S-UE) of the user equipment, wherein the enhanced BSR carries the buffer data status information of the multiple B-UEs buffered by the S-UE;

a priority determining unit, configured to determine, according to the buffer data status information received by the device information receiving unit, the priorities of performing data transmission on the multiple B-UEs;

a scheduling information sending unit, configured to send the uplink scheduling information to the S-UE, wherein the uplink scheduling information carries the priorities, determined by the priority determining unit, of performing data transmission on the multiple B-UEs, so that the S-UE encapsulates some or all of currently buffered data of the multiple B-UEs into one MAC PDU according to the priorities of performing data transmission on the multiple B-UEs; and a data receiving unit, configured to receive the MAC PDU transmitted by the S-UE.

19. The system according to claim 18, wherein the base station further comprises:

a judging execution unit, configured to: when the data receiving unit receives the MAC PDU transmitted by the S-UE, determine whether the enhanced BSR reported by the S-UE is received, and if not, continue to execute, by using the scheduling information sending unit, the step of sending uplink scheduling information to the S-UE.

20. The system according to claim 18, wherein the priority determining unit comprises:

a first determining subunit, configured to determine, in the multiple B-UEs, one or more B-UEs of a first priority according to the buffer data status information, and determine that another B-UE except the B-UE of a first priority is B-UE of a second priority, wherein a priority level of the first priority is higher than a priority level of the second priority; and a second determining subunit, configured to: when the first determining subunit determines that multiple B-UEs of a first priority exist, determine priorities of the multiple B-UEs of a first priority.

* * * * *